March 24, 1970 S. H. PEARSON 3,502,350
STABILIZING DEVICE FOR AN ARTICULATED VEHICLE
Filed Oct. 21, 1968 2 Sheets-Sheet 1

Inventor
STEPHEN H. PEARSON
By *Smiley & Smiley*
Attorneys

March 24, 1970   S. H. PEARSON   3,502,350
STABILIZING DEVICE FOR AN ARTICULATED VEHICLE
Filed Oct. 21, 1968   2 Sheets-Sheet 2

Inventor
STEPHEN H. PEARSON
By *Imrie & Smiley*
Attorneys

United States Patent Office 3,502,350
Patented Mar. 24, 1970

3,502,350
STABILIZING DEVICE FOR AN ARTICULATED VEHICLE
Stephen Haswell Pearson, Glasgow, Scotland, assignor to Adrolic Engineering Company Limited, Glasgow, Scotland
Filed Oct. 21, 1968, Ser. No. 769,001
Int. Cl. B62d 53/08
U.S. Cl. 280—432                    10 Claims

ABSTRACT OF THE DISCLOSURE

A stabilizing device for an articulated vehicle comprising two parts, one part for connecting to one element of the articulated vehicle and the other for connecting to the other vehicle element, the first part having two chambers and the second part having a device for varying the volumes of the chambers differentially and simultaneously during relative movement of the vehicle elements, the chambers being interconnected through two sets of valves one of which is open to give free fluid flow between the chambers when the vehicle is not braked, but closed when the brakes are applied, and the second set of valves being operable when the second part is disposed with respect to the first part so that one chamber volume is greater and the other chamber volume is less than their respective volumes when the vehicle elements are axially in alignment to provide access only from the greater to the smaller chamber.

BACKGROUND OF THE INVENTION

Field of the invention

The subject of this invention is a stabilizing device for an articulated vehicle.

It is well known that when an articulated vehicle such as that consisting of a tractor and a trailer is braked under certain conditions an effect popularly called jack-knifing tends to take place. Jack-knifing occurs when the trailer skids sideways relatively to the tractor.

Description of the prior art

Various forms of stabilizing devices intended to prevent this from occurring have already been proposed. One such stabilizing device consists of an oil-containing telescopic cylinder connected between the tractor and the trailer. During operation of the device the oil filled cylinder tends to resist extension and thus prevents jack-knifing.

Another form of stabilizing device which has been proposed is a friction pad fitted at the kingpin by which the trailer is connected to the tractor. For a friction pad device to be effective the frictional loading on the pad must be so high that steering of the vehicle becomes heavy.

Object of the invention

It is an object of the present invention to provide a stabilizing device capable of effectively preventing the occurrence of jack-knifing in an articulated vehicle yet which does not interfere in any way with normal steering of the vehicle.

SUMMARY

A stabilizing device according to the present invention incorporates a structure having one part containing two chambers, and a second part movable relatively to the first-mentioned part and including a device for varying the volumes of the chambers differentially and simultaneously during relative movement of the parts so that as the volume of one chamber is increased the volume of the other chamber is decreased by the same amount, the part containing the chambers being connectible to one element of an articulated vehicle and the part including the volume-varying device being connected to the other relatively movable element of the vehicle so that as the elements of the vehicle swing relatively to one another the parts of the stabilizing device move relatively to one another, the chambers being connected to one another by way of two sets of valve means one of which is open to provide free access between the chambers when the vehicle brakes are unapplied but which is arranged to become closed when the brakes of the vehicle are applied and the other of which is operable when the second part occupies a position relative to the first part such that the chambers have volumes greater and less respectively than the volumes they have normally when the parts are in the relative positions corresponding with the in-line position of the elements of the vehicle to provide access only from the chamber of greater volume to the chamber of less volume.

In one construction the chambers are connected to one another by way of a locking valve the operative member of which is connectible to the brake mechanism of the vehicle in such wise that the valve is normally open but is closed when the brakes of the vehicle are applied, and are additionally connected to one another by two connections in parallel with one another, each connection incorporating a non-return valve and a control valve, the control valves being operatively connected to the volume-varying means to provide that the control valve in one connection is opened when the two parts assume a relative position such that the volume of one chamber becomes smaller than the volume of the other chamber, the associated non-return valve in the same connection being set to prevent fluid flow towards that chamber, and the control valve in the other connection is opened when the two parts assume a relative position such that the volume of the other chamber becomes smaller than the volume of the first-mentioned chamber, the associated non-return valve in said other connection being set to prevent fluid flow towards said other chamber.

The two chambers may be formed in a circular casing containing a central shaft journalled therein and carrying a radial vane extending to the inner wall of the casing and a fixed radial partition extending from the shaft to the wall of the casing, the partition and the vane dividing the exterior of the casing into two chambers, the casing being connected to one element of the articulated vehicle and the shaft being connected to the other element of the vehicle in such wise that relative swinging movement of the elements of the vehicle causes the shaft to perform a rotary movement.

The valves and the connections between the two chambers may be external to the casing i.e., there may be pipe connections between the two chambers, the valves being intercalated in the pipe connections. Alternatively the connections my be internal connections, e.g., passages located within the casing. Conveniently the valves which are arranged to open when the chambers have respectively volumes greater and less than normal may be formed in the shaft, the shaft presenting ports which co-operate with a valve member fixed to the casing. The valve member may be a sleeve surrounding the pivot or may be an inner fixed member located within the shaft.

The valve means which is normally open when the vehicle brakes are unapplied but which is arranged to become closed when the brakes of the vehicle are applied may consist of a cylinder passing through the wall of the casing and part way into a bore in the partition, the cylinder being formed with ports in communication with passages in the partition on opposite sides of the cylinder debouching into the respective chambers, and a free piston slidable in the cylinder and protruding from the inner end of the cylinder into the bore, the piston being formed with an abutment engageable with the inner end of the cylinder, with at least one annular groove registering with the ports when the abutment is in engagement with the cylinder, and with a passage leading from the annular groove to the end of the piston protruding into the bore, the outer end of the cylinder being in communication with a passage connectible to the hydraulic system of the brakes of the vehicle.

In another construction the two chambers are constituted by cylinders within which pistons are slidable, the pistons being interconnected to move simultaneously, the cylinders being attached to one element of the vehicle and the pistons being connectible to the other element of the vehicle.

BRIEF DESCRIPTION OF THE DRAWINGS

One embodiment of the invention is illustrated in the accompanying drawing in which.

DESCRIPTION OF THE PREFERRED EMBODIMENT

Figure 1:
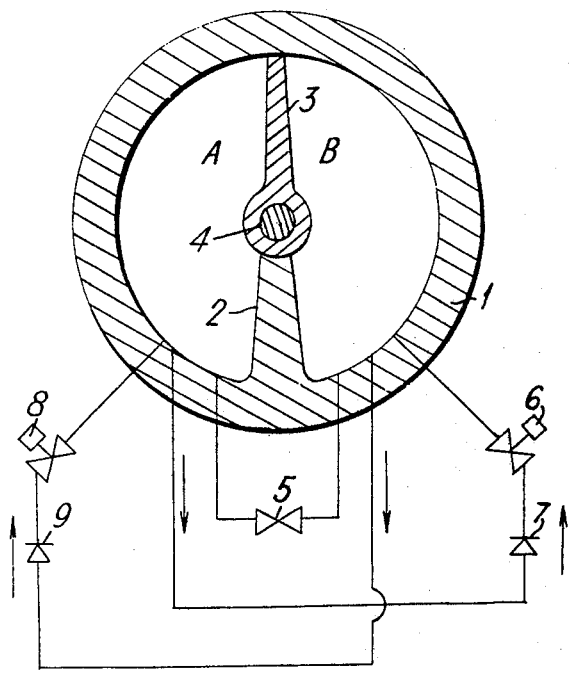
FIG. 1 is a diagram showing the rotation of the various parts of the device to one another and FIG. 2 illustrates one construction of the valve which is normally open to provide free access between the chambers.
Figure 2:
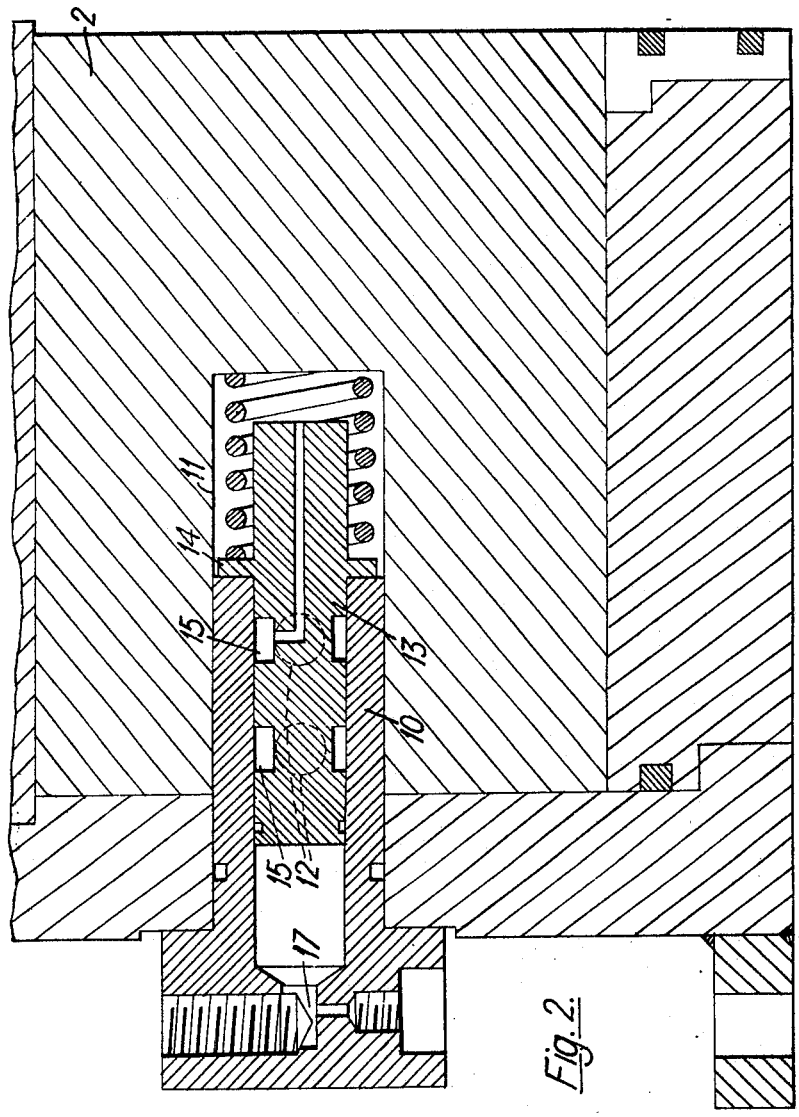

In the drawings, 1 denotes a circular casing containing a fixed radial partition 2 and a radial vane 3 fixed to a control shaft 4 journalled in the casing 1, the partition 2 and the vane 3 together dividing the casing into two chambers A and B. 5 in FIG. 1 denotes the valve shown in detail in FIG. 2 as arranged to fit within the partition 2, this valve being the locking valve arranged to provide free access between the chambers A and B when the brakes of the vehicle are off but to close when the brakes of the vehicle are applied. 6 denotes a control valve arranged to be operated according to the position of the vane 3 to be open when the vane 3 is on the side of the mid-position in line with the partition 2 in which the volume of the chamber A is greater than the volume of the chamber B, the valve 6 being in series with a non-return valve 7 in a line connecting the chambers A and B, the non-return valve 7 being arranged to be open to liquid flowing from the chamber A to the chamber B but to be closed to liquid flowing in the reverse direction. 8 denotes a control valve arranged to be operated according to the position of the vane 3 to be open when the vane 3 is on the side of the mid-position in line with the partition 2 in which the volume of the chamber B is greater than the volume of the chamber A, the valve 8 being in series with a non-return valve 9 in a line connecting the chamber A and B, the non-return valve 9 being arranged to be open to liquid flowing from the chamber B to the chamber A. The casing 1 and the shaft 4 are to be connected to the respective elements of an articulated vehicle in such wise that swinging movement of the vehicle elements relative to one another cause the shaft 4 to rotate relatively to the casing 1.

Referring to FIG. 2, the valve 5 consists of a cylinder 10 passing through the wall of the casing 1 and part way into a bore 11 in the partition 2, the cylinder 10 being formed with ports 12 in communication with passages in the partition 2 on opposite sides of the cylinder 10 debouching into the chambers A and B respectively, and a free piston 13 slidable in the cylinder 10 and protruding from the inner end of the cylinder 10 into the bore 11, the piston being formed with an abutment 14 engageable with the inner end of the cylinder 10, with two annular grooves 15 registering with the ports 12 when the abutment 14 in in engagement with the cylinder 10, and with a passage 16 leading from one annular groove 15 to the end of the piston 13 protruding into the bore 11, the outer end of the cylinder 10 being in communication with a passage 17 connectible to the hydraulic system of the brakes of the vehicle.

In practice, when the vehicle is running normally with the brakes off the locking valve 5 is open. When the vehicle is steered right or left the trailer assumes an angular position with respect to the tractor. There is no resistance to this angular movement since, although the vane 3 swings in the casing 1 to increase the volume of one chamber A or B and decrease the volume of the other chamber B or A fluid can flow freely through the locking valve 5 which is held open by the slight pressure generated alternately in the chambers A and B by the normal slight relative movement of the vehicle elements during normal steering being communicated through the passages in the partition 2, the annular grooves 15, and the passage 16 to the inner end of the bore 11, the piston 13 being thus thrust to the position in which the abutment is against the inner end of the cylinder 10 and the passages on opposite sides of the partition 2 debounching into the chambers A and B being in communication with one another by way of the ports 12 in the cylinder 10 and the annular grooves 15 in the piston 13. When the brakes of the vehicle are applied the pressure of the brake-operating liquid is raised and this raised pressure is applied by way of the passage 17 to the outer end of the piston 13 which is immediately moved to the position in which its inner end is against the inner end of the bore 11 so that the grooves 15 are out of register with the ports 12. The locking valve 5 is thus immediately closed thus preventing flow of fluid from one chamber A or B to the other chamber B or A. Any tendency for the vane 3 to swing from or further from its central position tends to reduce the volume of and increase the pressure in one chamber. Suppose it is assured that the vane 3 tends to swing to the position to reduce the volume of the chamber B. Flow of liquid from the chamber B is prevented by the non-return valve 7 and by the control valve 9 which latter valve is opened when only the volume of the other chamber A is reduced. The trailer is thus prevented from increasing its angle relative to the tractor. The trailer is, however, free to move to its central in-line position, i.e., directly behind the tractor because then the non-return valve 7 which blocked flow from the chamber B of smaller volume, being subjected now to a pressure in the opposite direction caused by the attempt of the vane 3 to swing back to the centralised position corresponding with the in-line position of the tractor and the trailer, opens and as the control valve 6 in series with it is already open because of the position of the vane 3 fluid may flow freely from the chamber of greater volume A to the chamber of smaller volume B, thus permitting the vane 3 to swing freely back to its centralized position. No resistance is thus imposed on the movement of the trailer back to its central in-line position.

A construction according to the invention is compact and takes up comparatively small space, all parts open to fluid are always full of fluid, under normal conditions the steering of the vehicle is unaffected and although any tendency to jack-knifing is instantly resisted no restraint is placed on any tendency shown by the trailer to move back to the central in-line position directly behind the tractor. In addition the driver of the vehicle does not have to manipulate or connect together parts as is necessary when a telescopic type of stabilizer is in use.

I claim:

1. A stabilizing device for an articulated vehicle incorporating a structure having one part containing two chambers, and a second part movable relatively to the first-mentioned part and including a device for varying the volumes of the chambers differentially and simultaneously during relative movement of the parts so that as the volume of one chamber is increased the volume of the other chamber is decreased by the same amount, the part containing the chambers being connectible to one element of an articulated vehicle and the part including the volume-varying device being connectible to the other relatively movable element of the vehicle so that as the elements of the vehicle swing relatively to one another the parts of the stabilizing device move relatively to one another, the chambers being connected to one another by way of two sets of valve means one of which is open whereby to provide free access between the chambers when the vehicle brakes are unapplied but which is ararnged to become closed when the brakes of the vehicle are applied and the other of which is operable when the second part occupies a position relative to the first part such that the chambers have volumes greater and less respectively than the volumes they have normally when the parts are in the relative positions corresponding with the in-line position of the elements of the vehicle to provide access only from the chamber of greater volume to the chamber of less volume.

2. A device as claimed in claim 1 in which the chambers are connected to one another by way of a locking valve the operative member of which is connectible to the brake mechanism of the vehicle in such wise that the valve is normally open but is closed when the brakes of the vehicle are applied, and are additionally connected to one another by two connections in parallel with one another, each connection incorporating a non-return valve and a control valve, the control valves being operatively connected to the volume-varying means to provide that the control valve in one connection is opened when the two parts assume a relative position such that the volume of one chamber becomes smaller than the volume of the other chamber, the associated non-return valve in the same connection being set to prevent fluid flow towards that chamber, and the control valve in the other connection is opened when the two parts assume a relative position such that the volume of the other chamber becomes smaller than the volume of the first-mentioned chamber, the associated non-return valve in said other connection being set to prevent fluid flow towards said other chamber.

3. A device as claimed in claim 1 in which the two chambers are formed in a circular casing containing a central shaft journalled therein and carrying a radial vane extending to the inner wall of the casing and a fixed radial partition extending from the shaft to the wall of the casing, the partition and the vane dividing the exterior of the casing into two chambers, the casing being connected to one element of the articulated vehicle and the shaft being connected to the other element of the vehicle in such wise that relative swinging movement of the elements of the vehicle causes the shaft to perform a rotary movement.

4. A device as claimed in claim 1 in which the valves and the connections between the two chambers are external to the casing.

5. A device as claimed in claim 1 in which the connections between the two chambers are internal connections.

6. A device as claimed in claim 1 in which the valves which are arranged to open when the chambers have respectively volumes greater and less than normal are formed in the shaft, the shaft presenting ports which cooperate with a valve member fixed to the casing.

7. A device as claimed in claim 6 in which the valve member is a sleeve surrounding the shaft.

8. A device as claimed in claim 6 in which the valve member is an inner fixed member located within the shaft.

9. A device as claimed in claim 1 in which the two chambers are constituted by cylinders within which pistons are slidable, the pistons being interconnected to move simultaneously, the cylinders being attachable to one element of the vehicle and the pistons being connectible to the other element of the vehicle.

10. A stabilizing device as claimed in claim 1 in which the valve means which is normally open when the vehicle brakes are unapplied but which is arranged to become closed when the brakes of the vehicle are applied consists of a cylinder passing through the wall of the casing and part way into a bore in the partition, the cylinder being formed with ports in communication with passages in the partition on opposite sides of the cylinder debouching into the respective chambers, and a free piston slidable in the cylinder and protruding from the inner end of the cylinder into the bore, the piston being formed with an abutment engageable with the inner end of the cylinder, with at least one annular groove registering with the ports when the abutment is in engagement with the cylinder, and with a passage leading from the annular groove to the end of the piston protruding into the bore, the outer end of the cylinder being in communication with a passage connectible to the hydraulic system of the brakes of the vehicle.

References Cited

UNITED STATES PATENTS

| 2,170,898 | 8/1939 | Humphrey | 280—432 |
| 2,692,146 | 10/1954 | Black | 280—432 |
| 3,420,548 | 1/1969 | Wakeman | 280—432 |

FOREIGN PATENTS 205,442  9/1956  Australia.

LEO FRIAGLIA, Primary Examiner

U.S. Cl. X.R.

188—97